Nov. 14, 1950

A. LUDWIG 2,529,507

AUTOFOCUSING ENLARGER

Filed Sept. 27, 1946

Nov. 14, 1950  A. LUDWIG  2,529,507
AUTOFOCUSING ENLARGER
Filed Sept. 27, 1946  5 Sheets-Sheet 3

Inventor
Anthony Ludwig
By Walter W. Burns
Attorney

Nov. 14, 1950      A. LUDWIG      2,529,507
AUTOFOCUSING ENLARGER
Filed Sept. 27, 1946      5 Sheets-Sheet 4
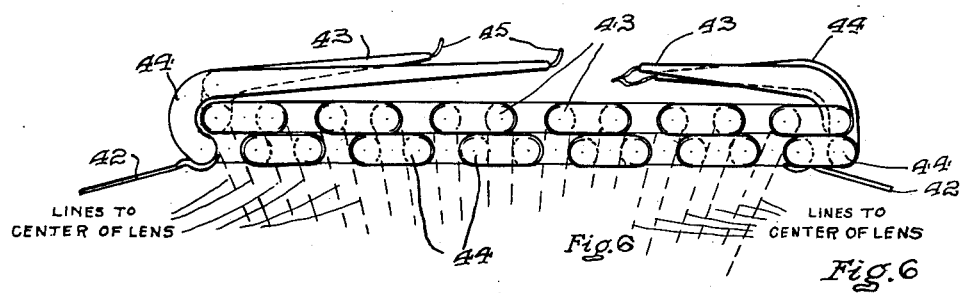
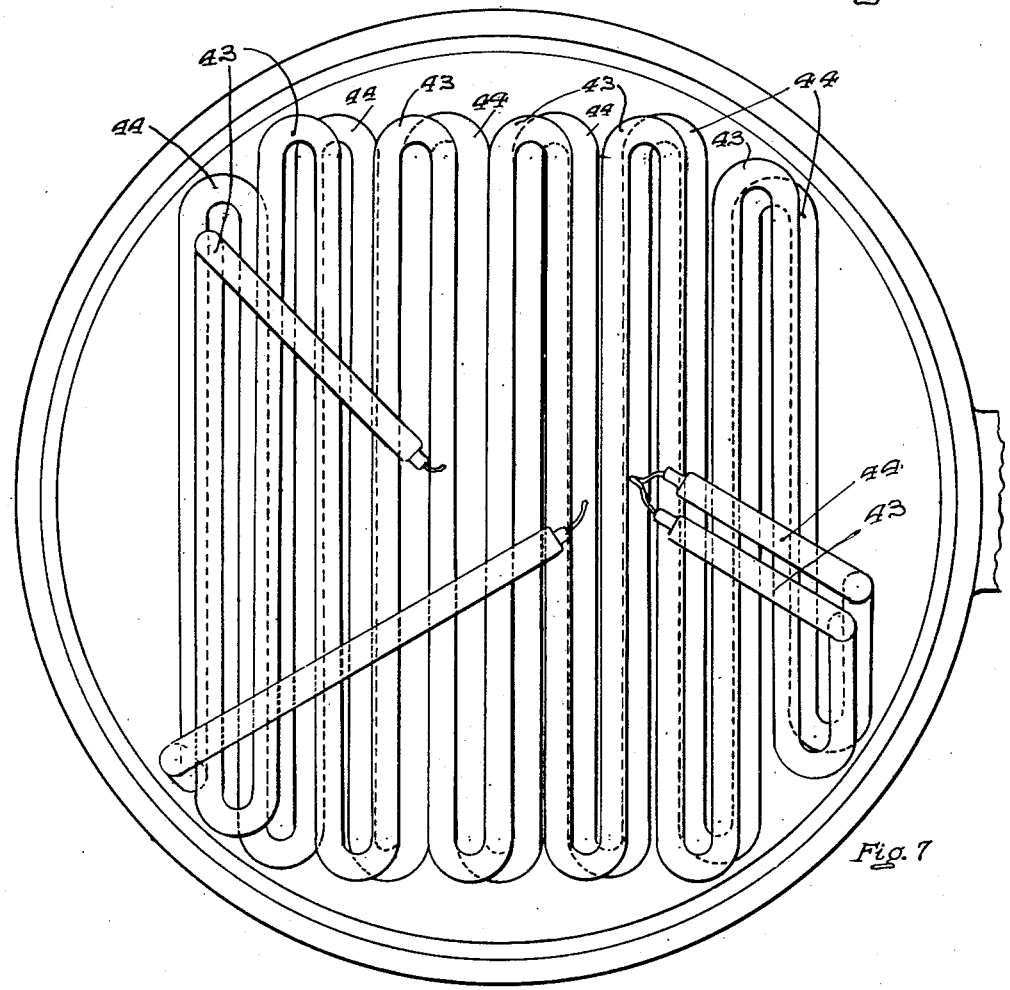
Inventor
Anthony Ludwig
By Walter W. Burns
Attorney

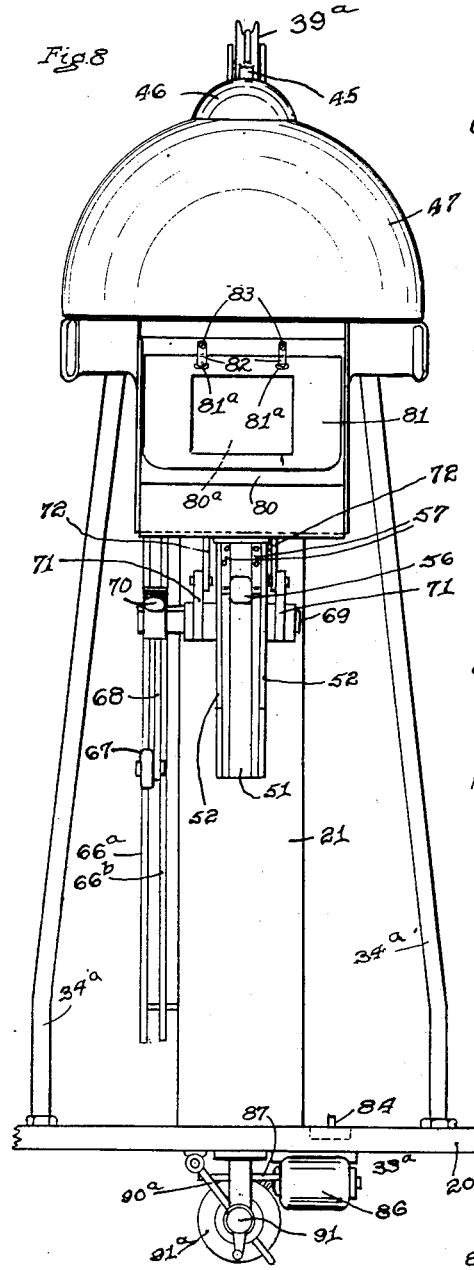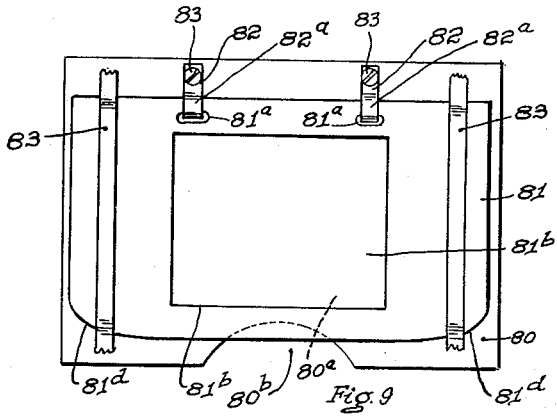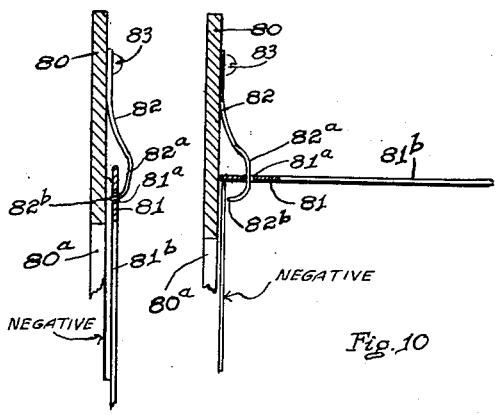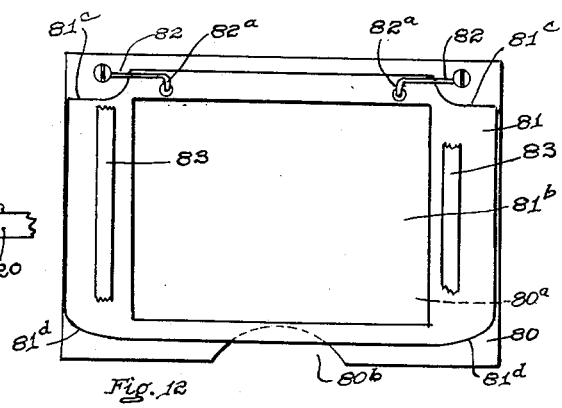

Patented Nov. 14, 1950

2,529,507

UNITED STATES PATENT OFFICE 2,529,507

AUTOFOCUSING ENLARGER

Anthony Ludwig, Washington, D. C.

Application September 27, 1946, Serial No. 699,812

1 Claim. (Cl. 88—24)

This invention relates to photographic devices and particularly to enlarging apparatus.

In the use of present-day apparatus for making enlargements from photographic negatives, much difficulty is experienced by the operative due to the fact that it is necessary to do so many preliminary operations before the actual exposure is made. This results in too much expenditure of the time of the operative and a consequent lowering of the efficiency of the apparatus as a whole.

The primary object of the present invention is the provision of an improved enlarging machine.

Another object of the invention is the provision of an improved enlarging machine during the use of which the operative has the movement of the focusing parts under his control at the level of the table.

Another object of the invention is the provision of an improved enlarging machine wherein provision is made for the accurate adjustment of the machine for various degrees of magnification by the movement of a single control member at table height.

A further object of the invention is the provision of an improved enlarging machine wherein there is an automatic cam controlled movement of the lens carrier to maintain the machine constantly in focus during the change in the enlargement ratio.

Another object of the invention is the provision of an improved enlarging machine wherein it is possible to use any one of a plurality of lenses each having a different enlarging ratio thus enabling designing of a single machine to enlarge negatives of many different sizes from 5" x 7" or even larger if desired to the smallest in use at this time.

Another object of the invention is the provision of an improved enlarging machine wherein a single motor or hand operated elevating screw controls the up and down movement of the enlarging camera with means for at the same time controlling accurately the movement of the lens carrier to keep the machine in focus.

Another and further object of the invention is the provision of an improved enlarging machine wherein a single-lever and cam mechanism controls the automatic focusing of the machine.

Another and still further object of the invention is the provision of a lamp for an enlarging machine or other photographic reproducing machine wherein a uniform volume of light from a two-blank cold cathode fluorescent tubular lamp covers the entire negative from all angles providing a diffused light source which does not accentuate defects, scratches, etc., as is the case with sharp condenser-controlled illumination, and which reduces the heat from the light source to a minimum thus avoiding the buckling of negatives from heat, causing blurred out of focus enlargements.

Another and further object of the invention is the provision of an improved enlarging machine having a negative holder and carrier wherein the carrier and holder when in operative position will be spring-held to hold the negative in position, thus making a glass negative holder unnecessary.

Another and still further object of the invention is the provision of an improved enlarging machine wherein the negative holder is provided with two leaves hinged together with a resilient hinge having a resilient feature which causes the upper leaf to be held in raised or open position during the changing of the negatives and upon closing, grips the negative before the cover plate is fully lowered.

Another and further object of the invention is the provision of an improved enlarging machine which can be operated by the operative while seated at the table; the changing of the enlargement ratio, the operation of the illumination, the insertion and removal of negatives, the changing of the machine from long focus to short focus or from short focus to long focus, and the automatic focusing of the machine, all being accomplished without the necessity of the operative leaving his seat at the table; thus saving a large amount of time and energy, and with a minimum of fatigue.

Another and further object of the invention is the provision of a simplified automatic mechanism which has a minimum number of parts, is definite and accurate in its operation with a minimum of wearing places, thus insuring a long life for the machine and an accurate performance.

Another object of the invention is the provision of an improved enlarging machine having an improved chain lifting means for the enlarging camera which may be operated either by motor or by hand power.

Another object of the invention is to provide an enlarging machine with a sliding negative carrier which when moved from the exposing position, lights a pilot light underneath it to facilitate the placing of the negative in the masking negative holder; the negative carrier sliding in a controlled path; saving time in removing and replacing the carrier; also in placing the negative in the masking holder.

Other and further objects of the invention will be apparent from a reading of the complete specification.

Referring to the drawing wherein are illustrated embodiments of the invention,

Figs. 6 and 7 are respectively elevational and plan views of the lighting element.

Fig. 8 is a front elevational view of the structure illustrated in Fig. 2.

Figs. 9 to 12 are detail views of two forms of negative holders.

Fig. 14 is an enlarged detail view of a portion of the lens holder means shown in Figs. 1 and 2.

Figure 1:
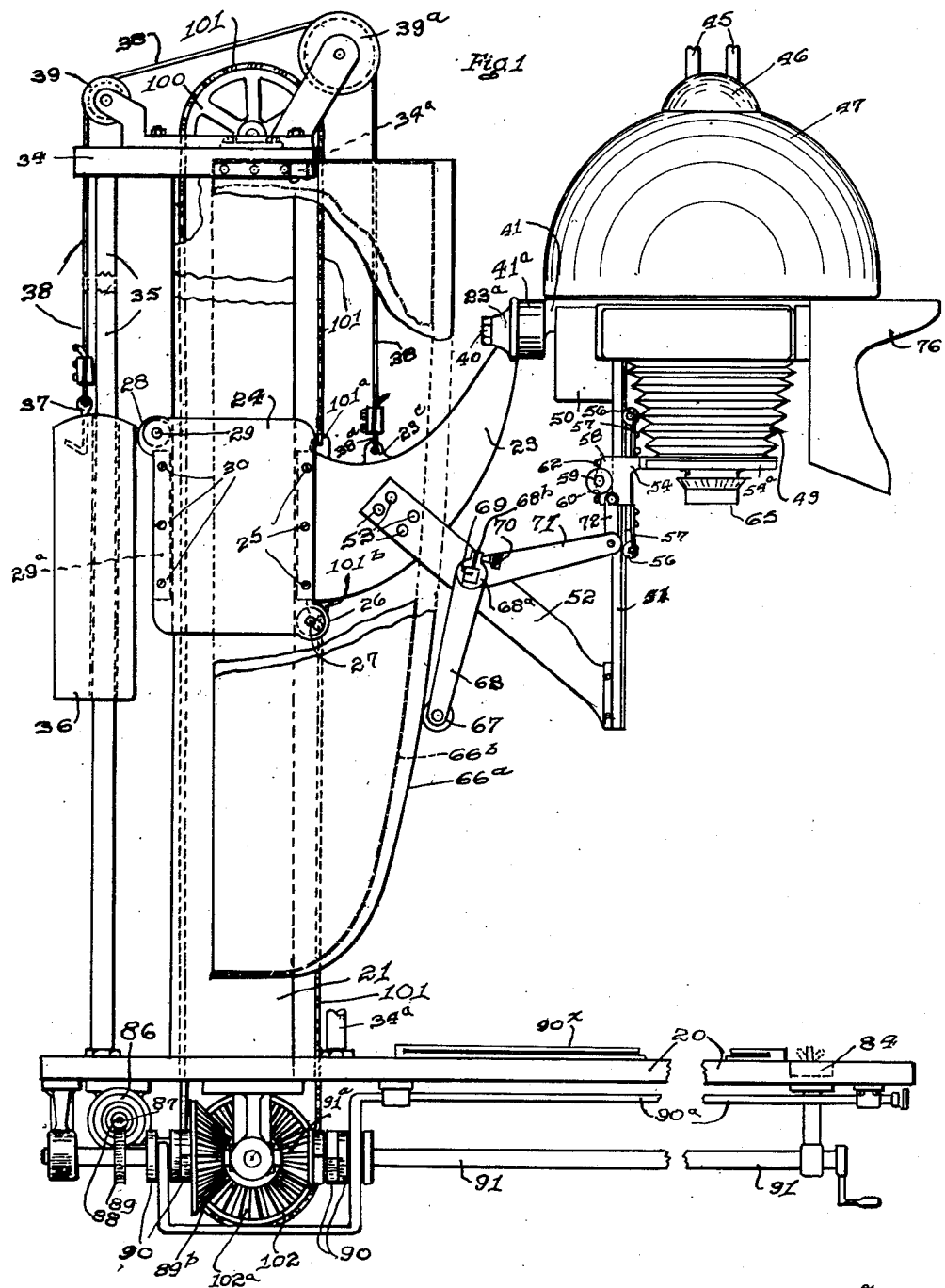
Fig. 1 is a side elevational view of one embodiment of the enlarging machine.
Figure 2:
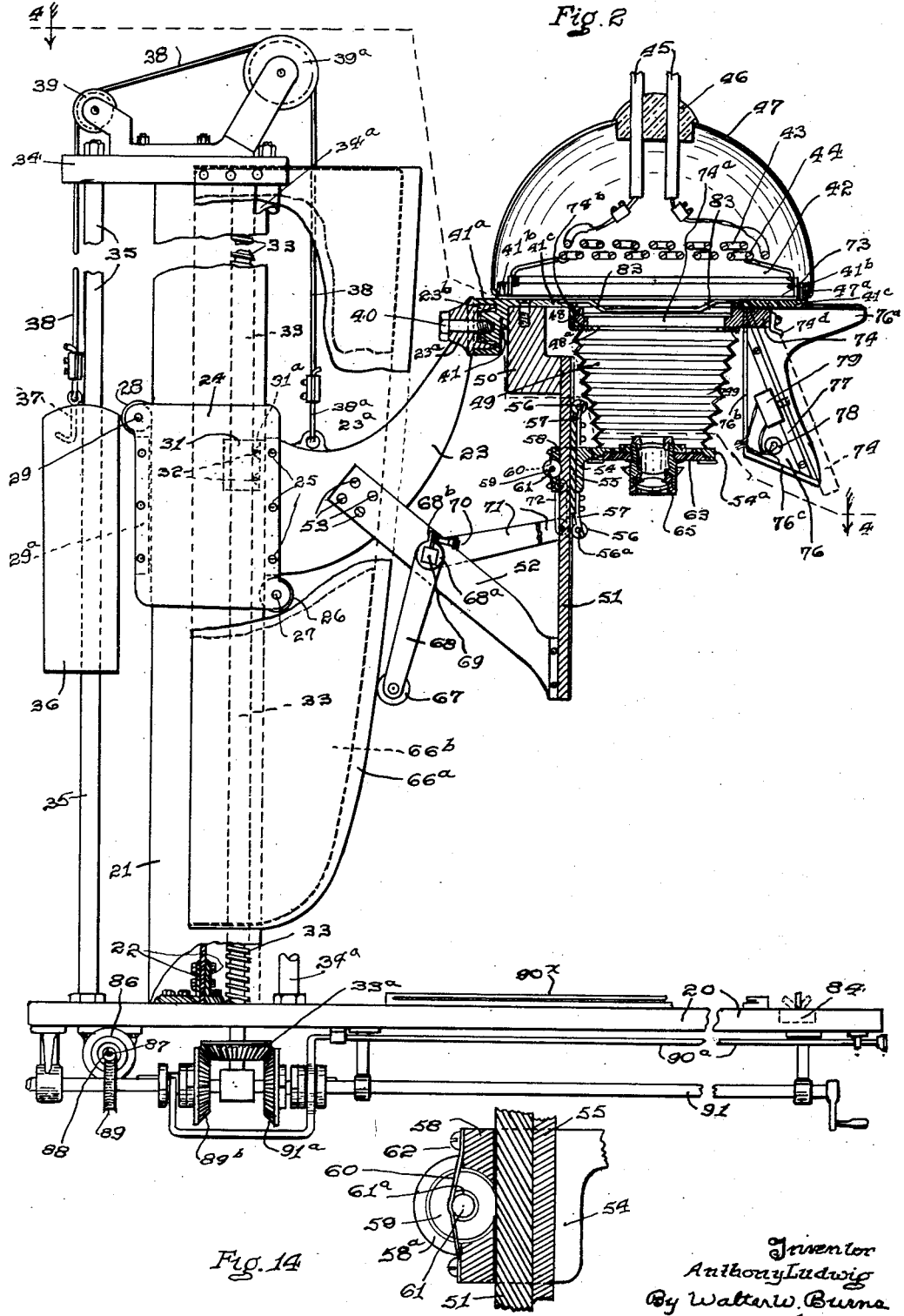
Fig. 2 is a partial vertical cross sectional view of another embodiment than that illustrated in Fig. 1.
Figure 3:
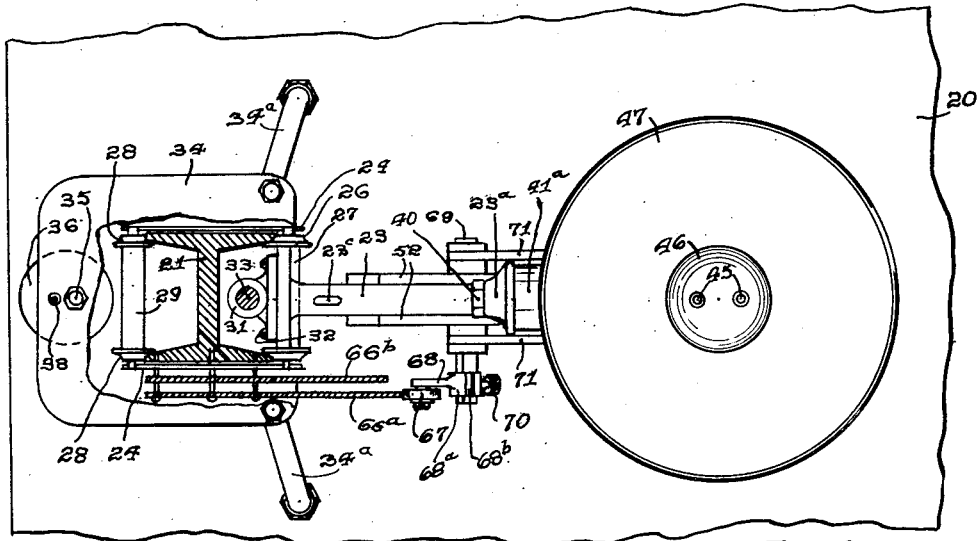
Fig. 3 is a top plan view, partially in section, of the structure shown in Fig. 1.
Figure 4:
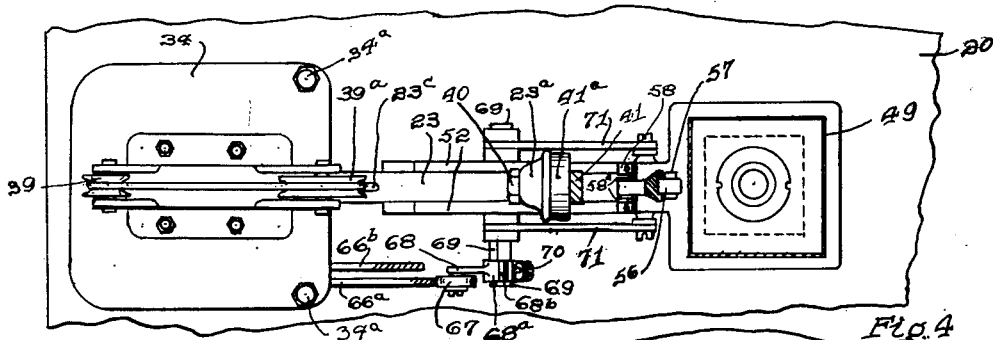
Fig. 4 is a cross sectional view on the line 4—4 of Fig. 2.
Figure 5:
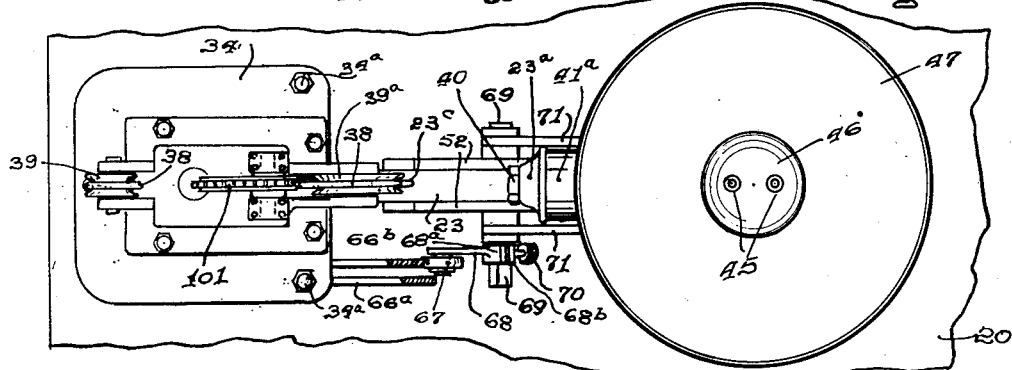
Fig. 5 is a top plan view of the embodiment of Fig. 1.
Figure 13:
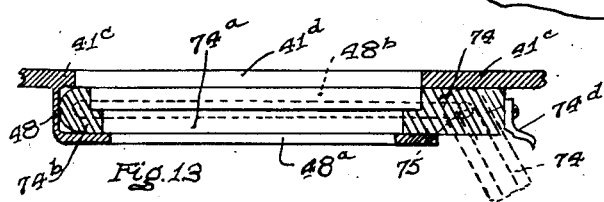
Fig. 13 is an enlarged view of the negative holder carrier as illustrated in Fig. 2.

Referring to the drawing wherein is illustrated an embodiment of the invention, the numeral 20 designates the table of the enlarging machine upon which is placed the paper holder during the enlarging operation.

Extending upwardly from the rear of the table is a standard or support 21 in the form of an H-bar upon which travels a carriage which supports the enlarging camera with all its appurtenances as will be presently described. The lower end of the standard 21 is held in place on the table with a pair of small angle irons 22 which are attached to the table and standard between the flanges of the H-bar. The outer surfaces of the H-bar are preferably finished so that the main carriage of the enlarging camera may move smoothly thereon as will be described.

The carriage comprises an arm 23 which is connected to a pair of plates 24 as by the screws 25. Beneath the arm 23 and journaled in the lower corners of the plates 24, is a pair of rollers 26 mounted on a shaft 27. Another pair of rollers 28 is provided at the opposite side of the standard 21 and these rollers are supported on a shaft which is journaled in the upper corners of the plates 24. The rear edges of the plates 24 are secured to a block 29 by the screws 30. Since the wheels 26 and 28 are flanged, and since there is a slight clearance between the sides of the H-bar 21 and the plates 24, it is obvious that the weight of the parts to be desscribed, at the outer end of the arm 23, will keep the wheels in contact with the flanges of the H-bar and on opposite sides thereof.

Secured to the arm 23 and between the two opposite flanges of the H-bar 21 is a carriage-moving nut 31 which is provided with flanges 31a which are secured to the carriage supporting arm 23 by the screws 32. Extending substantially the length of the H-bar 21, is a screw 33 which has a coactive engagement with the nut 31. As shown, the screw 33 when it rotates, raises and lowers the nut 31 and the arm 23 as will be fully explained.

At the top of the H-bar 21 is a head-piece 34. This head-piece is constructed to fit the top of the H-bar and is held in place by suitable braces 34a. A rear brace bar 35 is secured to the headpiece and extends, in the form shown, vertically downward to the table where it is suitably secured in place. On this brace 35 is slidably mounted a counterweight 36 for reducing the work necessary in the moving of the arm 23 and the parts carried thereby. A hook 37, preferably encased in the weight 36, serves as an attaching means for the wire cable 38 which passes over pulleys 39 and 39a which are suitably journalled on the headpiece 34. The other end of the cable is attached to the arm 23 at the lug 23c by the loop 38a. It is here noted that the weight of the counterweight 36 is substantially equal to the weight of the arm 23 and the parts carried thereby.

At the end of the arm 23 farthest from the H-bar 21 is an adjustable head 23a having an opening for an adjusting screw 40. The screw 40 centers a flange 23b which coacts with a complementary portion 41a of the bracket member 41. The bracket member 41 acts as the main body member of the enlarging camera and carries the light. The main portion of the bracket member 41 is annular in shape to provide an opening for the passage of the light as will presently appear.

The lamp which is the source of illumination will now be described. Forming an integral part of the bracket 41 is a flange 41b which extends around the entire circumference of the bracket and provides a means for limiting the movement of the lamp will now be described.

A shield 42 is provided which fits the inside of the flange 41b and has an opening at its opposite side for the lamp proper. This opening is substantially rectangular as herein illustrated.

Disposed to substantially cover the opening in the shield 42 is a double bank cold volt fluorescent tubular lamp. These tubes are designated 43 and 44, the former being superimposed on the latter. These tubes are connected together in series and are connected to a high voltage line 45, the leads of which pass through an insulator 46. The insulator 46 is supported in the top of a shell or dome 47 which has a turned-under roll flange 47a to resiliently engage the outer edge of the flange 41b.

The construction of the tubes 43 and 44 is such that each is complementary to the other in a manner to be now described. The tube 44 is doubled back and forth in one plane in such a manner that the space between the parallel portions of each fold are of a distance apart about equal to the diameter of the tube. The other tube 43 is constructed so that from the center outwardly, the spaces between the parallel portions increase in width. The purpose of this is to obtain the full light from the tube 43 through the spaces of the tube 44. If the spaces between the parallel portions of the tube 43 were equal and opposite the spaces of the tube 44, it is believed to be obvious that a part of the spaces of the tube 44 would not be covered by the outer tube 43. The widths of the spaces between the parallel portions of the tube 44 are such that when lines are drawn from the center of the lens to and tangent to opposite adjacent sides of the tube 44, the lines extended will pass to a portion of the tube 43.

It will be noted that the two light coils of tubes 43 and 44 are constructed separately. This is the preferred form. If the two coils are constructed as a unit, the method of forming the coils to get them in close proximity, is such that when the coils are heated, they may stick together. If this takes place, the tube may become damaged when the cooling takes place.

A further reason for the preferred form is that if one of the tubes or coils becomes broken, it can be replaced without replacing the whole assembly. By having the two tubes or coils 43, 44 in two parts, it is possible to have them lie in close proximity and attain the very important object of having the spaces of the tube nearest the negative position fully occupied by the other tube, thus presenting the full volume of light from the full area of the light opening.

This type of lamp provides an illumination which eliminates the necessity of using expensive condensing lenses, which, unless they are of the highest quality and are color corrected, introduce color difficulty when making color enlargements from natural color positives.

This type of illumination also eliminates all difficulty of maintaining sharp focus in glassless negative carriers caused by heat buckling the negatives being used.

Secured at the underside of the flat portion 41b of the bracket 41 is a rectangular box or frame 48 which has an opening in its bottom as at 48a. This opening 48a is provided to pass the light from the lighting element 43, 44 through the negative holder to the lens as will be described. The frame 48 which may be integral or attached to the flat portion 41c, is provided with an opening at the front of the machine to permit the negative carrier to be inserted or withdrawn by the operator.

Connected to the lower side of the negative carrier bracket 41 is a hanger bracket 50 which serves as a support for the lens carrier guide 51. This lens carrier guide 51 has its opposite end supported by the long bracket members 52 which in turn are supported from the arm 23, by the screws 53.

Sliding on the guide 51 is the lens carrier 54. The slide-contacting members 55 which guide the carrier 54 having at their ends rollers 56 which are connected to the slide contacting members by the roller bracket 57. The lens carrier 54 surrounds the guide 51 and has a bearing block 58 which carries a roller 59 to extend across the rear of the guide 51. The bearing block 58 is provided with slots 58a in which are wire springs 60. The roller 59 is journaled on the shaft 61 which is provided with suitable slots 61a. When the parts are in place, the springs 60 are held in place by the screws 62. As the rollers 56 are mounted on non-resilient shafts 56a and since the shaft 61 has a slight resilient movement, it will be clear that the lens carrier, while having a smooth movement, will not be permitted to be easily shaken from its proper position regardless of its adjustment on the guide 51.

The lens carrier 54 is provided with a recess on its side away from the negative carrier in which is a lens board 63 held in place by the retainer strips 64. The lens board 63 is provided at its center with an opening in which the lens holder 65 is secured in a well known manner.

A suitable lens is provided in the lens holder 65. As indicated in the drawing, lines from the center of the lens will pass to the light source and with the tubes 43, 44 constructed and arranged as shown, these lines will always pass to a portion of one of the tubes. By like reasoning, there will be light coming from the light source from a continuous area bounded by the outer periphery of the opening in the shield 42, to the center of the lens. This feature tends to make the light uniform in all portions of the image at the projection plane.

Connecting the lens carrier and the near side of the frame 48a is the bellows 49 which fits tightly to exclude undesired light, in a manner well known in the art. It is noted that the tubes 43 and 44 are made separately and then assembled in close proximity to each other. This is preferable, as already indicated, for the reason that it is possible to get the two tubes closer together when made separately than when they are made integrally and without either causing damage to the other in the making.

In order to provide a mechanism to raise and lower the enlarging camera relative to the table and to raise and lower the lens carrier relative to both the table and negative carrier, there is provided an automatic focusing mechanism which keeps the enlarging camera in focus and the image on the table sharp, regardless of the distance of the negative carrier from the table—in other words, regardless of the enlargement ratio. The means for carrying out this feature will now be described.

Secured to the standard or H-bar 21 there is provided one or more cams. In the present embodiment, I provided two such cams 66a and 66b. The cam 66a, I term the short focus cam and the cam 66b, I term the long focus cam, since these two cams are for use with two different lenses with relatively short and long focal lengths. These two cams 66a and 66b are placed side by side and in position to cooperate with a common means operatively connecting the cam being used, to the lens carrier to move the latter relatively to the table and negative carrier as will be described.

Co-acting with the cams selectively, is a cam roller 67 which is mounted on a focusing lever 68. This focusing lever 68 is adjustably and slidably but non-rotatively mounted on the square shaft 69. This shaft 69 is rotatively mounted in the members 52 which are secured to the arm 23 on opposite sides thereof and converge to a connection with the guide 51 as already mentioned.

The hub 68a of the focusing arm 68 is split as at 68b. To force the split portions together, there is provided a knurled-handled tightening screw 70 to adjustably secure the arm 68 to the squared shaft 69. Secured also to the shaft 69 are two lifting arms 71, which have at their outer ends, a pivoted connection with the lifting links 72. These lifting links 72 are pivotally connected at their other ends to the lens carrier bracket 54. It is thus believed to be clear that as the arm 23 lifts the fulcrum of the bell crank formed by the focusing arm 68, the shaft 69 and the lifting arms 71, the roller 67 by its coaction with the cam 66a or 66b, as the case may be, will cause the relative movement of the lens carrier in accordance with the shape of the cam being used.

In order to shift from one cam to the other, it is necessary only to loosen the screw 70, raise the lens carrier with the hand and slide the focusing arm to a position where the roller 67 will engage the other cam, tighten the screw 70 and release the hand from the lens carrier.

On the upper surface of the annular portion 41c is placed a ground glass 73 which ground glass serves as a diffuser. Below the ground glass 73 and slidably mounted in the frame 48 is a negative holder and its slide carrier which will now be described.

The main frame of the negative holder carrier,

I have designated at 74. This frame 74 has an opening 74a corresponding to the opening 41d and the opening 48a. A shoulder 74b is provided as a rest for the negative holder to be presently described. The negative holder carrier 74 is provided with slots 48b which are engaged by the pins 75 which latter are secured in the sides of the pilot light box which I have designated generally at 76. A handle or finger piece 74d is provided on the negative holder carrier 74, for use of the operator in withdrawing the carrier. This pilot light box 76 has sides 76a, a back 76b and a bottom 7c. Arranged in a slanting plane is a negative carrier support 77 which is in the form of a frame with an opening large enough to take care of the largest negative for which the machine is designed. Within the box 76 and between the back 76b and the frame 77 is a pair of pilot lights 78 which may be of 15 watt illumination rating.

At one side of the frame 77 is a switch 79 which controls the illumination of the lights 78. The switch 79 is so arranged that when the negative holder carrier 74 is withdrawn from its position as when the enlarging operation is not taking place and is lowered on the frame 77, the pilot lights 78 will come on and when the negative holder carrier is in place for enlargement, the pilot lights 78 will be extinguished. It is to be here noted that the pins 75 are so placed that when the negative holder carrier is pulled out to its limit and the free side lowered, its under side will contact the frame 77 throughout its full length.

The negative holders are all of the same outer size regardless of the opening for the particular size negative being used. They consist of two leaves or plates hinged together with a suitable hinge which is capable of holding the upper hinged section in raised position. The lower or base plate 80 is of a size to completely fill the recessed space caused by the shoulder 74b of the negative holder carrier 74. Hinged at the upper or far side of the base plate 80 is a cover or hold-down plate 81 for holding the negative in place during the printing operation. The cover plate 81 has openings 81a for the reception of the ends of the springs 82. These springs 82 which are held by the screws 83 have portions 82a which are substantially parallel to the plate 81. They also have turned down ends 82b of a length somewhat greater than the thickness of the plate 81 to perform the function of a negative holding or retaining means. However, when the upper plate 81 is swung upwardly the parallel portions 82a of the springs are raised and the plate 81 is frictionally held in raised position during the time the negative is being changed. When a negative is inserted and the upper leaf or cover plate 81 is partially lowered, the ends of the spring engage the negative, at which time the hands of the operator may be released from the negative and the plate 81 lowered against the plate 80. The particular shape of these springs may be varied according to the particular size of negative opening used.

In using negative openings 80a and 81b in the respective plates 80 and 81 of a maximum size, the upper plates are cut away as at 81c to provide spaces for the springs 82. To facilitate lifting the upper plate 81 while holding the lower plate 80, the corners of the upper plate 81 are cut away as at 81d. To further facilitate the raising of the upper plate, the lower plate 80 is recessed as at 80b to permit the finger of one hand of the operative to easily get under the edge of the plate 81.

When the negative holder 80, 81 is in place in the negative holder carrier 74, and the negative is in place and the upper plate 81 has been lowered the whole carrier 74 is raised to a position where it may be pushed into the frame 48. As it moves to its position for the enlargement, the springs 83 which are located at the sides of the opening in the annular portion 41c, press downwardly on the upper plate 81 and hold the negative firmly between the plates 80 and 81.

The operation will now be described.

Assuming the short focus lens to be installed in the lens board 63 and the roller 67 to be in registration with the short focus cam 66a, the negative holder carrier 74 is withdrawn by the hand of the operator with the use of the handle 74d and lowered onto the frame 77. This operates the switch 79 to light the bulbs 78. A negative holder 80, 81 with the proper size opening is selected and placed in the carrier 74. The upper leaf or plate 81 is raised and the negative put in place, after which the upper plate 81 is lowered. When partially lowered the down-turned ends 82b of the spring 82, engage and hold the negative in place. The plate 81 is further lowered to hold the negative against the lower plate 80. The carrier is now raised and pushed inwardly to place the negative in position for enlarging and under the springs 83 which press downwardly on the plate 81.

The switch 84 is now operated from the stop position to either the "up" or "down" position. This causes the proper circuit to be closed and the starting of the motor, 86 in the desired direction. This movement through the shaft 87 causes a turning of the worm 88 and in turn, the slower turning of the worm gear 89. And since the worm gear 89 is mounted on a shaft 89a which carries a bevel gear 89b which in turn operates the bevel gear 33a on the lower end of the raising and lowering screw 33, it follows that the nut 31 will be moved in the direction corresponding to the turning movement of the screw 33. This raises or lowers the whole enlarging camera by its arm 23 and the relative movement of the negative carrier toward or away from the table and the position where the enlarging paper is located. A double clutch member 90 connects either the motor 86 or the hand crank shaft 91 to the bevel gear 89b or the bevel gear 91a to drive the bevel gear 33a by motor or by hand.

And as the movement of the negative carrier is brought about, the action of the cam 66a on the roller 67 moves the focusing arm 68, its shaft 69 and the lifting arms 71. Through the links 72, the lens bracket 54 is then given movement relative to both the negative carrier and the table 20, so that the enlarging image is maintained in sharp focus regardless of the adjustment of the enlarging camera.

By reversing the movement of the switch 84 and stopping at the point where the desired ratio of enlargement has been reached, the machine is ready for the actual printing operation.

The paper having been placed in the paper holder, at the proper position, the main light switch is operated with the resultant illumination of the tubes or coils 43, 44. As the machine is always in focus, it is only necessary to expose the enlarging paper for the required time, when the switch is turned to "off" position. The enlargement paper is now developed.

The several advantages of the invention will now be summarized. Whether the manual or motor means is used for adjusting the enlargement ratio, the construction provides such a practically effortless adjustment as to save much of the operative's time and energy in making hundreds of adjustments in the course of a day.

The negative carrier with its varisize masking negative holders saves time in placing the negative in the exposure position and the gripping feature insures a rapid placing of the negative in place and its being held there when so placed.

The arrangement of the tubes in the light permits the use of a minimum consumption of power for a maximum of diffusion for any given diffuser used and a closer placement of the light source to the diffuser and negative, with a delivery of a stronger light to the enlarging paper, thus permitting a saving of time by shorter exposures compared to previous methods of using this general type of light.

The simplified automatic focusing construction is so made that there is practically no way of its being thrown out of adjustment, thus assuring sharp pictures without any loss of time in focusing or in adjustment of the automatic focusing mechanism.

With each improvement being constructed to save time and effort in setting up the machine for making an enlargement, the operative is enabled to make many more enlargements in a given time than has been possible with previous machines constructed to handle such a large variety of sizes and ratios of enlargement.

While there has been described an embodiment of the invention with certain modifications, it is to be understood that the disclosure is merely illustrative and that many modifications and changes may be made without departing from the spirit of the invention and within its scope as claimed.

The means for raising and lowering the enlarging camera may take the form of a chain and sprocket means which will now be described. In this form, which it is believed will operate over a long period of time as efficiently as the screw and nut construction already described, there is provided a sprocket or pulley 100 at the top of the standard 21. A chain or cable 101 is attached at one end of the arm 23 as at 101a and extends over the sprocket or pulley 100, downwardly and under the sprocket or pulley 102 and is secured to the bottom of the arm 23 as at 101b. In this construction, the sprocket and chain is considered the equivalent of the pulley and cable construction.

As in the case of the nut and screw construction already described, this sprocket and chain construction may be operated by the motor under control of an electric switch 84 or it may be operated by hand if no power is available. To bring about this alternate or optional use, there is provided a bevel gear 102a which is attached to the sprocket 102 and is operated by either, but not both at once, of the bevel gears 89b or 91a. As in the case of othe other alternative construction, the double clutch 90 makes it possible to use either the motor or the hand crank 91, by a shifting of the clutch shifting bar 90a.

Reference is made to my copending application filed October 20, 1950, Serial No. 191,102.

Having described the invention, what is claimed is:

In an enlarging machine, an enlarging camera with relatively movable lens and negative holders and an automatic focusing mechanism with a plurality of controlling cams in close proximity to each other and on one side of the center of the camera, a bell crank lever connection between the lens and negative holders for moving one relative to the other, the bell crank connection comprising a rotatable shaft with means for preventing its axial movement, a pair of arms mounted on the shaft, one of the arms being fixed to the shaft and having a connecting means for lifting or lowering the lens holder relative to the negative holder, the other arm having shaft-connection means for preventing rotary movement about the shaft and for guiding the arm axially along the shaft to one of a plurality of positions for engagement with a selected cam and means for securing the second arm in adjusted position.

ANTHONY LUDWIG.

REFERENCES CITED

The following references are of record in the file of this patent:

UNITED STATES PATENTS

| Number | Name | Date |
|---|---|---|
| 1,406,041 | Lehto | Feb. 7, 1922 |
| 1,641,346 | Meder | Sept. 6, 1927 |
| 2,078,689 | Schneider | Apr. 27, 1937 |
| 2,117,754 | Bell | May 17, 1938 |
| 2,194,384 | Dewey | Mar. 19, 1940 |
| 2,263,025 | Young | Nov. 18, 1941 |
| 2,266,908 | Rogers | Dec. 23, 1941 |
| 2,306,666 | Simmon | Dec. 29, 1942 |
| 2,321,697 | Moulin | June 15, 1943 |
| 2,361,667 | Tessier | Oct. 31, 1944 |
| 2,372,910 | Pratt | Apr. 3, 1945 |
| 2,398,754 | Morrison | Apr. 16, 1946 |
| 2,415,424 | Gaebel | Feb. 11, 1947 |